(12) United States Patent
Regen

(10) Patent No.: US 6,232,553 B1
(45) Date of Patent: May 15, 2001

(54) JUNCTION BOX IMPROVEMENTS

(76) Inventor: David M Regen, 4342 Sneed Ave., Nashville, TN (US) 37215

( * ) Notice: Subject to any disclaimer, the term of this patent is extended or adjusted under 35 U.S.C. 154(b) by 0 days.

(21) Appl. No.: 09/378,941

(22) Filed: Aug. 23, 1999

(51) Int. Cl.[7] .................................................. H02B 1/30
(52) U.S. Cl. ........................ 174/64; 174/65 R; 220/3.8
(58) Field of Search ................................ 174/65 R, 53, 174/64, 60, 17 CT, 48, 49, 135, 68.1; 220/3.2, 3.8; 439/394, 535

(56) References Cited

U.S. PATENT DOCUMENTS

| | | |
|---|---|---|
| 671,763 | 4/1901 | Greenfield . |
| 832,508 | 10/1906 | Slocum . |
| 832,509 | 10/1906 | Slocum . |
| 1,264,450 | 4/1918 | Sweet ........................................ 247/7 |
| 1,473,812 | 11/1923 | Clements ................................. 247/16 |
| 3,617,612 * | 11/1971 | Patton ...................................... 174/59 |
| 4,051,322 | 9/1977 | Park ........................................ 174/65 |
| 4,082,915 * | 4/1978 | Silver .................................. 174/65 R |
| 4,449,015 * | 5/1984 | Hotchkiss et al. ................. 174/138 F |
| 4,818,822 * | 4/1989 | Yahraus ................................... 174/53 |
| 5,155,300 * | 10/1992 | Brandner ............................ 174/65 R |
| 5,306,870 * | 4/1994 | Abat ................................. 439/394 X |
| 5,837,936 * | 11/1998 | Rogers et al. ....................... 174/65 R |
| 5,853,098 * | 12/1998 | Elder ...................................... 220/3.7 |
| 6,069,317 * | 5/2000 | Wagganer ........................... 174/65 R |
| 6,103,972 * | 8/2000 | Hagarty .................................. 174/53 |

* cited by examiner

Primary Examiner—Kristine Kincaid
Assistant Examiner—Dhiru R Patel

(57) ABSTRACT

A house-wiring junction box having most conventional properties (compositions, shapes, dimensions, components, abilities) but being unconventional largely in that all side-wall cable ports may be opened both axially and radially by virtue of the box's reversible assembly from bottom and top partial boxes, the bottom partial box having the floor and lower parts of the side walls of the junction box, the top partial box having the upper parts of the side walls and the open top face of the junction box, the assembly seam intercepting all side-wall cable ports. Any side-wall cable port of the junction box may be unconventional in radial dimensions and in having an unconventional cable clamp, the base of which is built on to the bottom partial box continuous with the lower arc of the unconventional cable port, the shoe-and-shield element of which may be a knock-out component of the top partial box, this element plugging the upper section of the unconventional cable port before it is removed for use in cable clamping, then shielding the same when used in cable clamping. Owing to these unconventional features, the junction box may be assembled about a connected branch junction or wired-up device and the cables thereof, the cables being clamped before or after this assembly.

3 Claims, 3 Drawing Sheets

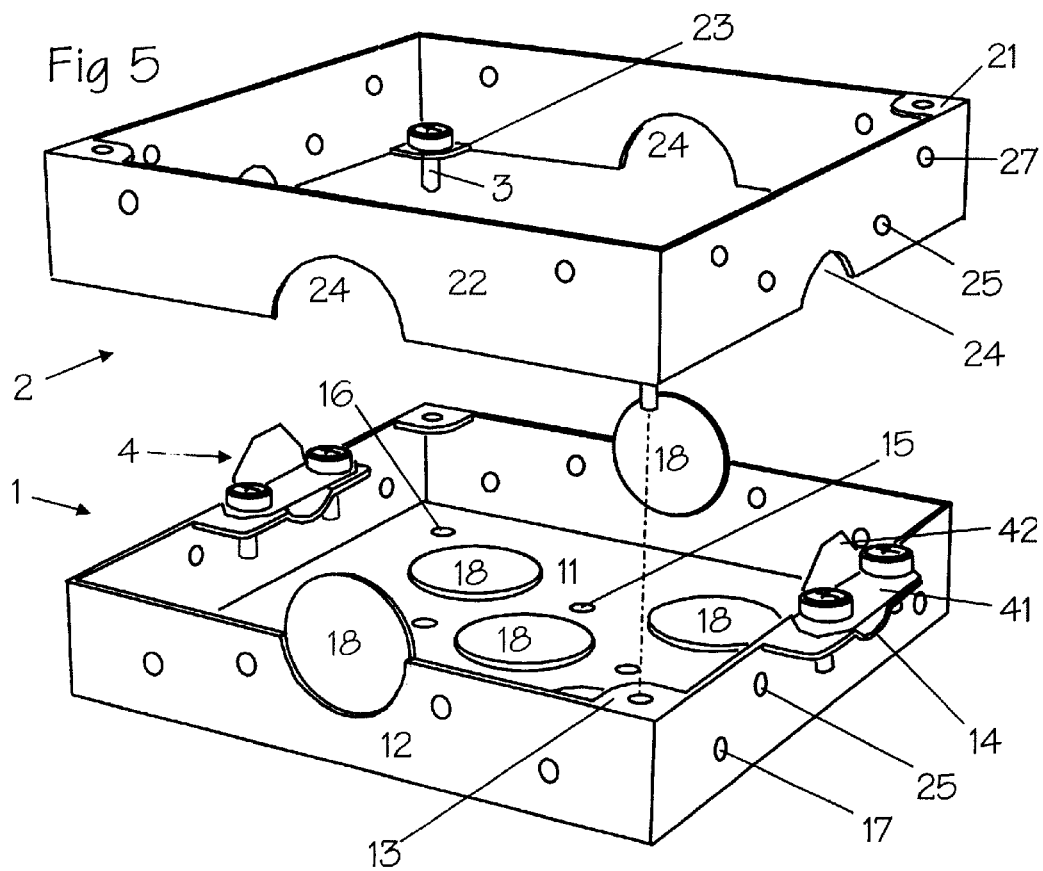
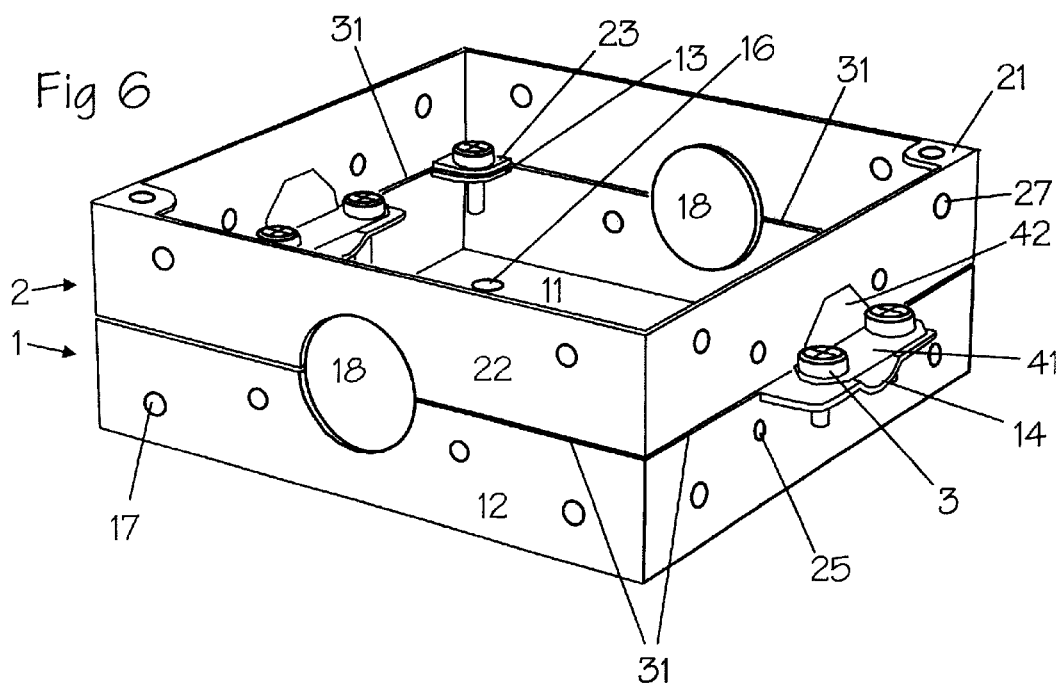

JUNCTION BOX IMPROVEMENTS

BACKGROUND OF THE INVENTION

1. Field of the Invention

This invention relates to the wiring which distributes electric power to various receptacles, switches and fixtures in a home or other building, specifically the means for containing and stabilizing connections among wires or between wires and switches or receptacles.

2. Description of the Related Art

Early 20th century patents (671 763; 832 508; 832 509; 1 264 450; 1 473 812) indicate that electrical junction boxes for wiring homes and other buildings have changed little for a century with respect to dimensions and functionalities, because those characteristics are very suitable for the intended purposes. Recently, polymers have been used in junction-box manufacture, but steel remains the dominant material.

Typically, the floor and side walls of a junction box have several cable ports with knockout plugs, any of which may be opened for installation of a cable clamp or conduit adaptor. Some junction boxes have cable clamps already in place at a few cable ports. In any case, the cut ends of cables must be threaded into a junction box via these entry points before connections are made. Installing the most common kind of cable clamp in a cable port is often tedious, and threading a cable into a junction box via the most common kind of built-in cable clamp is often tedious as is tightening of that kind of clamp. Making connections among wires confined at their points of entry into a junction box is often tedious, and connecting such confined wires to a receptacle, switch or other device can be tedious. Moreover, there are occasions where one desires to connect conductors of cables which have not been cut through completely, and this is very awkward with conventional junction boxes. The junction box disclosed herein facilitates all of these tedious and awkward operations by allowing an already connected wire-to-wire junction or an already wired-up device to be placed in the box as its cables are laid in their respective ports, any of which may have an associated clamp which is built on to the box.

The applicant has not seen a manufactured junction box with this capability and has not found a patent for a junction box able to accept an already connected branch junction (involving three or four cable ports and clamps). The applicant did find two patents for junction-boxes which would allow placement of an extension junction, a switch or a receptacle (involving no more than two cables) in the box after its connections are made. The junction box of Park (4 051 322) is fabricated as two hemiboxes which come together side-by-side at a seam through the floor and two opposite side walls. The hemiboxes are hinged to each other along the floor seam. The seam intercepts a cable port on each of two opposite side walls, and these two cable ports are opened radially when the box is opened at the seam. The design provides for only two ports able to accept the cables of a preformed junction. It appears that the concept could have been extended to a second seam and hinging means transverse to the first, by having two hinges symmetrically placed on each floor seam rather than one, thereby providing four radially openable cable ports. Park's design envisioned conduit attachments and did not show built-in cable clamps. The hinged junction box appears to be relatively expensive. The junction box of Yahruaus (4 818 822) for containing a receptacle or switch consists of two side-by-side hemiboxes, each with a hemiport contiguous with the assembly seam on each end of each hemibox. This design allows one to assemble the box and ports (with their built-in clamping means) around a wired-up device and the cable(s) thereto or to assemble the box and ports around an extension junction and its two cables. The side-by-side arrangement of partial boxes seems less suitable for branch junctions (needing three or four cable ports and cable clamps), since four ports formed this way would involve four quarter-boxes (a more complicated assembly, possibly with insufficient rigidity). The patents of Park and Yahraus are the only ones the applicant could find of house-wiring junction boxes able to accept a preformed junction, and neither has the capabilities of the one disclosed herein.

BRIEF SUMMARY OF THE INVENTION

Under most circumstances, it is easier to work with wires which are free and unconstrained near the zone of the work, than with wires confined inches from work by cable clamps in the cable ports of a junction box whose walls extend about an inch above the cable clamps. This is especially so if the junction box is fastened to its substratum in an awkward location. Therefore, it would usually be easier and occasionally much easier to install and revise junctions, if the junction could be placed in the junction box after it is formed or revised, its cables being brought to their ports and any associated clamps as the junction is placed in the box. A simple way to allow this is to manufacture the junction box as two partial boxes, a bottom partial box and a top partial box, as could almost be achieved by cutting a conventional junction box along a horizontal line (paralleling the floor) through those parts of the box which connect the top to the bottom, creating a seam which intercepts the side-wall cable ports but does not traverse their knockout plugs. Removing the knockout plugs opens their cable ports axially, and separating the two partial boxes from each other opens side-wall cable ports radially. Provisions to fasten the two partial boxes back together would be needed.

The manufacture of junction boxes as top and bottom partial boxes, which can be assembled and disassembled to close and open the side-wall cable ports radially, is the central and consistent feature of the invention. All other features of the resulting junction boxes are essentially conventional or optional. An important option is an unconventional side-wall cable port which is associated with a cable clamp whose base is built on to the bottom partial box. The assembled junction box may have any size and shape useful for house wiring and any useful and geometrically feasible number of cable ports in its floor and side walls; and it has other features typical of house-wiring junction boxes, such as means for fastening the junction box to a substratum and means for fastening a cover plate over the junction box's otherwise open top face.

The important consequence of this innovation is that the formation of wire connections to other wires or to devices, the clamping of the cables at their ports and the fastening of the box to a substratum may occur in any order—most importantly, a junction may be formed with the wires free from the box, the completed junction then placed in the bottom partial box as its cables are placed in the lower portions of their respective cable ports where they may be clamped by built-on cable clamps if present, after which the top partial box may be fastened to the bottom partial box, thereby assembling the junction box and its cable ports about the junction and its cables. For those cables in conventional cable ports, the cable clamps may be applied before or after the box is assembled, depending on the kind of clamp used. Fastening of the bottom partial box to a substratum may occur at any point in the process; and fastening of the top partial box to a substratum, if elected, would occur after the top partial box is fastened to the bottom partial box.

BRIEF DESCRIPTION OF SEVERAL VIEWS OF THE DRAWINGS

The drawings illustrate junction boxes fabricated as top and bottom partial boxes, and some of the many cable-port configurations compatible with this feature.

FIG. 5 shows the junction box in an embodiment having both conventional and unconventional side-wall cable ports.

FIG. 6 shows the embodiment of FIG. 5 in its assembled relations.

REFERENCE NUMERALS IN THE FIGURES

Figure 1:
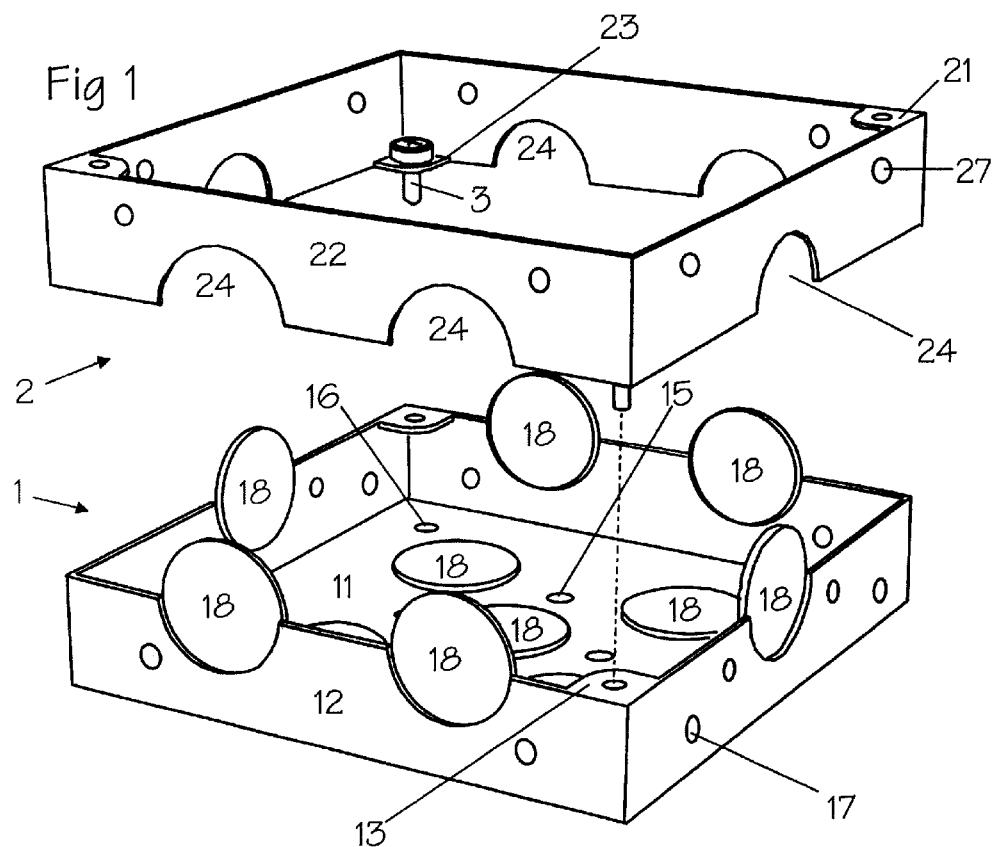
FIG. 1 shows the disassembled junction box in an embodiment wherein all cable ports are of conventional size and are equipped with conventional knockout plugs.

1. Bottom partial box
2. Top partial box
3. Conventional junction-box screw
4. Removable part of cable clamp
11. Floor of junction box
12. Wall of bottom partial box
13. Shelf with threaded hole for assembling junction box
14. Built-on cable-clamp base with two holes
15, 16, 17. Holes for fastening box to substratum
18. Conventional knockout plug
21. Shelf with threaded hole for fastening cover plate
22. Wall of top partial box
23. Shelf with hole fitting screw's shaft loosely for assembling junction box
24. Upper part of cable port
25. Threaded hole for fastening conduit adaptor
27. Hole for fastening box to substratum
28. Unconventional knockout plug
31. Seam where partial boxes meet for threaded for fastening item 4 assembly of junction box
41. Cable-clamp shoe
42. Cable-clamp shield
48. Knockout cable-clamp shoe-and-shield

DETAILED DESCRIPTION OF THE INVENTION

Physical Attributes of a Typical Embodiment

The invention is an improvement in junction boxes for containing and securing the connections among electrical wires and between wires and devices used in construction of homes and other buildings, the wires being of cables whose specifications are "10-2 with ground", "12-2 with ground" and "14-2 with ground". In a typical embodiment, the improved junction box has a square floor (11) about 4 in x 4 in, four rectangular side walls (12 plus 22) about 4 in wide and at least 1.5 in tall, and an open top face (opposite the floor) with means (21) for fastening a cover plate, as with many conventional junction boxes designed primarily to contain and stabilize connections among wires. The improved junction box has essentially all conventional structures and functions. For descriptive purposes, the box will be considered to rest with its floor (11) on a horizontal surface. Distinct from conventional junction boxes, the improved junction box is assembled by fastening of a top partial box (2) to a bottom partial box (1), and it is disassembled by the reverse process. Thus, the assembled junction box has a "horizontal" seam (31) through its side walls (12, 22) approximately midway between the junction box's floor (11) and its top face, or nearer to its floor. Both partial boxes have shelves (21, 13, 23), essentially 0.4 in×0.4 in square, extending horizontally inward from wall edges at various corners, these shelves being rounded at their inner-most corners. Two of the shelves (13) are at opposite upper corners of the bottom partial box, each pierced with a hole which is threaded for a conventional junction-box screw (3). Four of the shelves (23) are at the four lower corners of the top partial box, two at opposite corners being pierced with holes large enough to fit the shaft of a junction-box screw (3) loosely. The above pierced shelves (those at the upper corners of the bottom partial box (13) and the lower corners of the top partial box (23)) are for reversibly fastening the two partial boxes (1, 2) together. Two of the shelves (21) are at opposite upper corners of the top partial box, above the unpierced shelves at its lower corners, each pierced with a hole which is threaded for a junction-box screw (3), and these shelves (21) are for fastening a cover plate. Each side wall has at least one cable port. Side-wall cable ports are intercepted by the seam (31), so that cables may access the side-wall cable ports by radial translation when the box is disassembled. Each sidewall cable port is either of conventional design (18, 24), except for being divided between two partial boxes; or it is of unconventional design (14, 24, 28, 48) and associated with a cable clamp (14, 4, 41, 42, 48) whose base (14) is built on to the bottom partial box (1). The built-on cable clamp and unconventional cable port are constituted as follows. The cable-clamp base (14) is essentially a shelf about 1.3 in long in the direction of the wall of the bottom partial box from which it extends about 0.4 in horizontally outward or inward. The middle 0.5-in×0.4 in segment of this cable-clamp base (14) is cylindrically indented about 0.12 in toward the floor of the box, as is the adjacent wall edge to form the lower arc of the cable port. Each of the flat 0.4-in×0.4-in end segments of the cable-clamp base either side of the indented segment has a hole which is threaded to accept a conventional junction-box screw (3) and its free corner is rounded down. These holes are positioned so that the top (removable) part (4) of the cable clamp, the clamp shoe (41) with shield (42), may be identical to the corresponding part of a conventional cable clamp. The shield (42) has dimensions to cover the upper part of the cable port (24) and any adjacent breach in the side wall of the assembled junction box, and the cable-clamp shoe-and-shield element may be fabricated as a knockout component (48) of the top partial box, contoured to the upper part of the cable port (24). The floor (11) of the junction box has several conventional cable ports with knockout plugs (18). The junction box has several holes of size to accommodate the shaft of a drywall screw loosely, these holes being available for fastening the junction box to a substratum, eight of them (15, 16) in the box's floor (11), as many as sixteen of them (17, 27) in the side walls (12, 22). In addition to the characteristics mentioned, each unconventional cable port/clamp assembly (14, 24, 4, 28, 48) is surrounded by four holes (25), one about 0.25 in above and one about 0.25 in below each end of the cable-clamp base (14), these holes being threaded for conventional junction-box screws (3) and available for fastening a prospective conduit adaptor over the unconventional cable port and clamp (14, 24).

Figure 2:
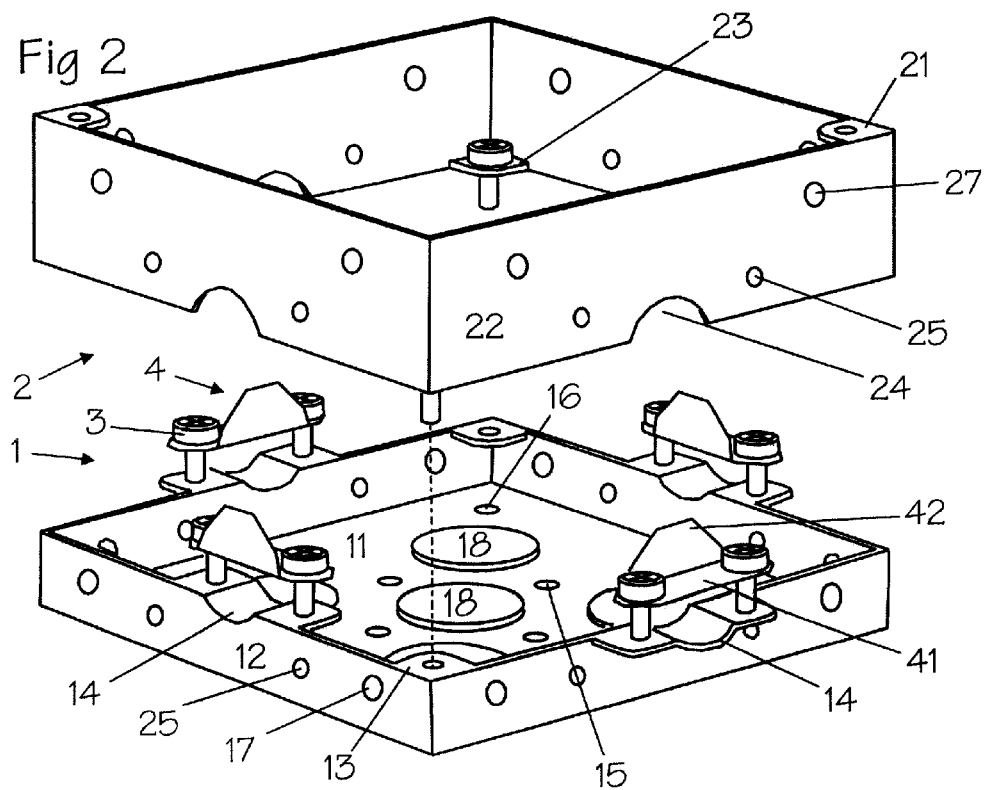
FIG. 2 shows the junction box in an embodiment wherein all side-wall cable ports are unconventional, one built-on cable clamp extending inward.
Figure 3:
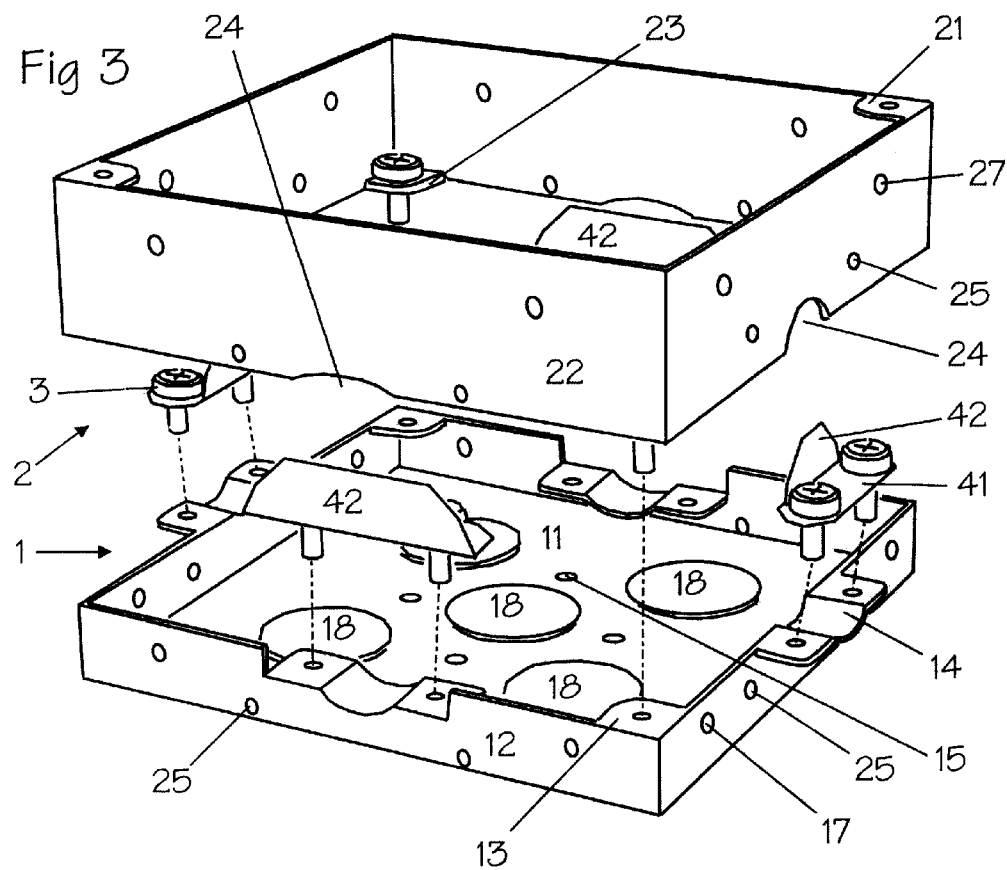
FIG. 3 shows the junction box in an embodiment wherein two clamps are positioned significantly below the upper edge of the bottom partial box, a wider cable-clamp shield being needed for this kind of cable clamp in this position.
Figure 4:
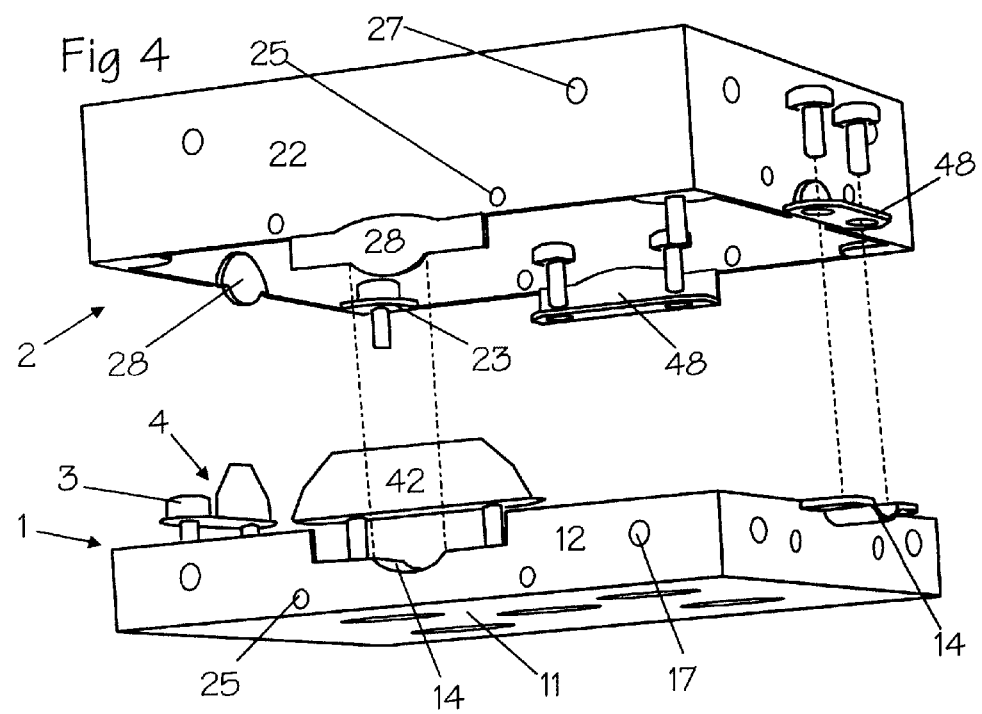
FIG. 4 shows an embodiment like that of FIG. 3, but with unconventional knockout plugs in some cable ports and knockout cable-clamp shoe-and-shield elements in others.

The applicant has built a prototype of the improved junction box which exhibits the essential features described above—being fabricated as reversibly fastenable bottom and top partial boxes, each side wall having an unconventional cable port intercepted by the assembly seam and associated with an unconventional cable clamp whose base is built on to the bottom partial box, essentially as in FIG. 2.

Physical Attributes of Other Embodiments

The invented junction box consists of two partial boxes, a bottom partial box and a top partial box, each having a portion of each side-wall cable port, as described above. Because the invention is an improvement, the junction box may have any shape and any dimensions useful for house wiring, any useful and geometrically feasible number of cable ports in the side walls and floor, any means for clamping cables in their ports, any means for attaching conduit adaptors to cable ports, any means for fastening the partial boxes to each other during assembly, any means for fastening the box to a substratum and any means for fastening a cover plate over the top face of the junction box.

Operation of Invention

Although the disclosed junction box has means for fastening conduit adaptors at the cable ports, the invention offers only minor advantages over existing junction boxes when conduits are needed. Therefore, it is expected that the invention will be used mostly in crawl spaces, unfinished basements, unfinished attics, stud spaces, and possibly in some garages, where conduits are not needed; so only this kind of use will be described.

In a conventional junction-box installation not involving conduits, selected cable ports are opened by removal of their knock-out plugs, cable clamps are installed in these ports, the junction box is fastened to a substratum, the ends of cut cables are threaded into the box via the clamps with several inches of cable inside the box, the clamps are tightened on the cables, the sheaths are removed from most of the lengths of the cables in the box, ground wires are attached to each other and pushed to the box's floor, about ¾ in of insulation is removed from the cut ends of the otherwise insulated conductors, the denuded end segments of corresponding conductors are juxtaposed with their tips touching each other or nearly so, and a wire nut is applied to each such group of juxtaposed conductors. Holding or securing three or four wires in the optimal relation to each other for reliable application of a wire nut is very challenging when the wires are confined in a junction box, their cables clamped several inches from the denuded tips.

With the invention disclosed herein, installation of a one-to-two branch or a one-to-three branch is easier than the above procedure in several ways. In some embodiments, no cable ports need be opened by removal of knockout plugs, since sufficient cable ports are already open; and, in these and some other embodiments, no cable-clamps need be installed, since sufficient cable-clamps are built on, one at each unconventional side-wall cable port. If the worker elects to follow the conventional order (clamping the cables in place before desheathing, denuding and connecting), then all operations on wires are somewhat easier, since little or no wall surrounds any portion of the wires to obstruct access by fingers and tools, the cable clamps being at or near the bottom partial box's open face. This is also helpful in revision. Most important is that the worker may desheath, denude and connect wires with the cables free of the box, then place the completed junction in the bottom partial box as its cables are placed in the lower parts of their cable ports and any associated cable clamps. This is easier, since the wires can be manipulated closer to the worker's body where visibility is better, hands are steadier, more wire is exposed to fingers and tools and the wires to be connected can be more easily juxtaposed with their tips adjacent to each other for confident application of a wire nut. Moreover, with this junction box, any cable which can be strung between two of the terminals via the junction point need not be cut through at the junction point. It can be desheathed over several inches surrounding the junction point, its conductors denuded over a 1.5-in segment symmetrically about the junction point, and the wires bent double at the junction point; so that, for purposes of wire nut application, two wires are manipulated as one. If cutting of cables at the junction can be avoided, no more than two items need be juxtaposed for each wire-nut application, even with a one-to-three branch junction. The completed junction can then be placed in the bottom partial box as its cables are placed in their respective ports and any associated clamps. Making a junction on an uncut cable is sometimes desirable for other reasons and would be quite difficult with a conventional junction box. After the junction is in the bottom partial box and its cables are clamped by any built-on cable clamps, the top partial box may be fastened to the bottom partial box, thereby assembling the junction box and its side-wall cable ports about the junction and its cables. Any cable in a conventional cable port (lacking a built-on cable clamp) may then be clamped by a conventional cable clamp designed for this kind of application.

Possible manufacturing approaches

If the junction box is to be made of metal, the top and bottom partial boxes could be cut from approximately 16-gauge sheet metal by a dye, which may be able to produce the knockouts and punch the holes and score the bend zones simultaneously. For the bottom partial box, the next step would probably be to bend the side wall s, shelves and any built-on cable-clamp bases at right angles in the appropriate directions. A cable-clamp base (14) might be indented cylindrically during its bending or afterwards, and its holes might be punched along with the other holes or after it is indented. The top partial box would be cut as a strip which is as wide as the top partial box is tall and as long as the box's horizontal perimeter, with tab s (eventual shelves) extending laterally from both sides of the strip. Holes would presumably be punched out and the bend zones scored as the strip is cut out, any unconventional knockout plugs (28) or knockout shoe-and-shield elements (48) being produced simultaneously. After its tabs are bent into shelves at right angles to the strip and any knockout shoe-and-shield elements likewise bent, the strip would be bent into a rectangle and welded where the ends meet. Appropriate holes may be tapped (threaded) at any stage after they are punched.

If the junction box were to be made of a polymer, the partial boxes would be molded into their shapes, virtually in one step. All components of the partial boxes would be thicker especially in stress zones, and the partial boxes may need some ribs. Each shelf with a threaded hole (13, 21) would project through the full depth of the respective partial box, as would any built-on cable-clamp bases extending inward; and each shelf with a larger hole (23) would project about halfway up the top partial box in its respective corner. The shelves would therefore take the form of columns reinforcing the box at its corners. Any built-on cable-clamp bases extending outward would project substantially toward the floor.

Conclusion, Ramifications and Scope of Invention

The applicant has found no junction box patented or commercially available with the convenient features of the one described herein. Specifically: no other junction box allows such free access to the wires clamped in its side-wall cable ports, and no other junction box allows one to place a preformed one-to-two or one-to-three branch junction in the box.

I claim:

1. A house-wiring junction box including: a floor and side walls perpendicular to the floor and no top closure such that the side walls have top edges, and cable ports with knockout plugs in said floor and said side walls where cable clamps or conduit adaptors may be installed; wherein an improvement comprises fabrication of the junction box as two partial boxes, said partial boxes comprising a bottom partial box and a top partial box, said bottom partial box having said floor and portions of said side walls adjacent to said floor, said top partial box having the remainder of said side walls adjacent to said top edges, said partial boxes having means for being reversibly fastened to each other in assembly of said junction box, the assembled junction box having a seam where said partial boxes are juxtaposed for assembly, said seam intercepting said cable ports in said side walls; whereby, each said cable port in said side walls in absence of an associated one of said knockout plugs is open both axially and radially when said top partial box is displaced from said bottom partial box, hence said junction box may be assembled about a connected branch junction and its cables; wherein a further improvement comprises at least one unconventional cable port in at least one said side walls, said at least one cable port having a durable association with a cable clamp, said cable clamp comprising a base, a shoe-and-shield element and two junction-box screws, said base being built on to said bottom partial box in such position that said cable clamp can appropriately secure a cable traversing said at least one cable port with which said cable clamp is associated, said shoe-and-shield element being reversibly fastenable by said junction box screws to said base in a manner which provides for adjustable clamping force on said cable traversing said cable clamp and said at least one cable port, said shoe-and-shield element when so fastened essentially covering all portions of said at least one cable port of said assembled junction box which are not between said shoe-and-shield element and said base, said cable clamp having no enclosing structure when said shoe-and-shield element is unfastened and displaced from said base, whereby said cable may be placed in said at least one cable port and said cable clamp by radial translation when said junction box is disassembled and said shoe-and-shield element is unfastened and displaced.

2. The cable-clamp base of claim 1, wherein said base extends essentially at a right angle from said at least one said side walls of said bottom partial box at or near said seam, said base extending inward or outward about 0.4 inch from said at least one said side walls over a 1.3-inch horizontal length of said at least one said side walls, said base having a 0.5-inch×0.4-inch middle segment continuous with a 0.4-inch×0.4-inch end segment on either side of said middle segment, each said end segment having a free corner distal to said at least one said side walls and distal to said middle segment, said free corner being blunted, said middle segment being cylindrically indented concave up with axis perpendicular to said at least one said side walls from which said base extends, said middle segment being smoothly continuous with a bottom arc of said at least one cable port with which said cable clamp is associated, each said end segment being horizontally flat and pierced with a hole which is threaded for one said junction-box screw, said holes having centers approximately 0.87 inch from each other and 0.2 inch from said at least one said side walls.

3. The cable-clamp shoe-and-shield element of claim 1, wherein the shoe-and-shield element is weakly attached to said top partial box as a knockout component in the upper part of the associated said at least one cable port, said shoe-and-shield element so attached having dimensions and position such that said shoe-and-shield element covers the upper part of said at least one cable port of said assembled junction box except for a small space between said shoe-and-shield element and said base, said shoe-and-shield element having a shoe component which is pierced with two holes fitting the shafts of said junction-box screws loosely, said holes having centers approximately 0.87 inch from each other.

* * * * *